(12) United States Patent
Stahl

(10) Patent No.: US 9,615,029 B2
(45) Date of Patent: Apr. 4, 2017

(54) METHOD AND APPARATUS FOR DETERMINING A NEED FOR A CHANGE IN A PIXEL DENSITY REQUIREMENT DUE TO CHANGING LIGHT CONDITIONS

(71) Applicant: Axis AB, Lund (SE)

(72) Inventor: Per Stahl, Malmo (SE)

(73) Assignee: Axis AB, Lund (SE)

(*) Notice: Subject to any disclaimer, the term of this patent is extended or adjusted under 35 U.S.C. 154(b) by 0 days.

(21) Appl. No.: 14/696,810

(22) Filed: Apr. 27, 2015

(65) Prior Publication Data
US 2015/0326791 A1 Nov. 12, 2015

(30) Foreign Application Priority Data

May 8, 2014 (EP) ..................................... 14167474

(51) Int. Cl.
*H04N 5/232* (2006.01)
*H04N 5/262* (2006.01)
(Continued)

(52) U.S. Cl.
CPC ........... *H04N 5/23296* (2013.01); *G03B 7/00* (2013.01); *H04N 5/2351* (2013.01);
(Continued)

(58) Field of Classification Search
USPC ..................................................... 348/222.1
See application file for complete search history.

(56) References Cited

U.S. PATENT DOCUMENTS 5,006,705 A * 4/1991 Saito .................... B41J 2/473
  250/235
6,710,801 B1 * 3/2004 Kubo ................. H04N 5/2259
  348/222.1

(Continued)

FOREIGN PATENT DOCUMENTS

CN   102332090 A   1/2012
GB   2 456 199   7/2009
(Continued)

OTHER PUBLICATIONS

Decision to Grant Patent dated Jun. 14, 2016, issued in Japanese Patent Application No. 2015-078249.
(Continued)

*Primary Examiner* — Roberto Velez
*Assistant Examiner* — Cynthia Segura
(74) *Attorney, Agent, or Firm* — Oblon, McClelland, Maier & Neustadt, L.L.P.

(57) ABSTRACT

There is provided a method for determining a need for a change in a pixel density requirement due to changing light conditions. The pixel density requirement specifies a pixel density which enables identification of an object in images captured by a camera. The method comprises receiving and monitoring (S02) a camera setting which is indicative of a light condition to which the camera is subjected and which affects the quality of images captured by the camera, and determining (S06) that there is a need for a change in the pixel density requirement upon detection (S04) of a change in the camera setting. The camera setting includes at least one of a gain and an exposure time used by the camera when capturing images.

17 Claims, 4 Drawing Sheets

(51) Int. Cl.
  *G03B 7/00* (2014.01)
  *H04N 5/235* (2006.01)
  *H04N 7/18* (2006.01)
  *G08B 29/18* (2006.01)

(52) U.S. Cl.
  CPC ....... *H04N 5/2352* (2013.01); *H04N 5/23245* (2013.01); *H04N 5/2628* (2013.01); *H04N 7/181* (2013.01); *G08B 29/18* (2013.01)

(56) References Cited

U.S. PATENT DOCUMENTS

| | | | |
|---|---|---|---|
| 7,885,531 B2 | 2/2011 | Kim et al. | |
| 8,189,086 B2* | 5/2012 | Hashimoto | H04N 5/3456 348/222.1 |
| 2003/0043292 A1* | 3/2003 | Pyle | H04N 5/2351 348/364 |
| 2006/0269105 A1 | 11/2006 | Langlinais | |
| 2007/0081841 A1* | 4/2007 | Nakano | G03G 21/043 400/62 |
| 2007/0188632 A1* | 8/2007 | Kobayashi | H04N 3/1562 348/240.99 |
| 2007/0242936 A1* | 10/2007 | Chujo | G03B 17/00 396/55 |
| 2009/0021621 A1* | 1/2009 | Hashimoto | H04N 5/3456 348/300 |
| 2009/0225189 A1* | 9/2009 | Morin | H04N 5/345 348/229.1 |
| 2011/0080479 A1 | 4/2011 | Trumbo et al. | |
| 2011/0128417 A1* | 6/2011 | Shioji | H04N 5/23245 348/240.3 |
| 2012/0069179 A1 | 3/2012 | Gish | |
| 2013/0010153 A1* | 1/2013 | Kasai | H04N 5/347 348/222.1 |
| 2013/0093923 A1* | 4/2013 | Imagawa | H04N 9/045 348/239 |
| 2013/0155295 A1 | 6/2013 | Bekiares et al. | |
| 2015/0002732 A1* | 1/2015 | Hjelmstrom | H04N 5/2353 348/362 |

FOREIGN PATENT DOCUMENTS

| | | |
|---|---|---|
| JP | 07-131700 | 5/1995 |
| JP | 2003078725 A | 3/2003 |
| JP | 2004297645 A | 10/2004 |
| JP | 2008052227 A | 3/2008 |
| JP | 2012-034304 | 2/2012 |
| WO | WO 03/036567 A1 | 5/2003 |
| WO | WO 2008/014001 A2 | 1/2008 |
| WO | WO 2013/039061 A1 | 3/2013 |

OTHER PUBLICATIONS

Notice of Allowance in Korean counterpart application 10-2015-0063328 (with English translation), mailed Oct. 18, 2016, 4 pages.
Search Report issued Sep. 12, 2016 in Taiwanese Patent Application No. 104113988 (submitting English translation only).
Office Action issued Aug. 12, 2016 in Chinese Patent Application No. 2015102181862 (submitting English translation only).

* cited by examiner

METHOD AND APPARATUS FOR DETERMINING A NEED FOR A CHANGE IN A PIXEL DENSITY REQUIREMENT DUE TO CHANGING LIGHT CONDITIONS

TECHNICAL FIELD

The present invention relates to the field of camera surveillance, and, in more detail, to identification of objects in accordance with a pixel density requirement in images captured by a camera. In particular, it relates a method, an apparatus, and a system for determining a need for a change in a pixel density requirement due to changing light conditions.

BACKGROUND

Camera surveillance has become more and more common. Images captured by surveillance cameras are for example used as evidence in police investigations and legal trials for the purpose of identification of objects, such as the face of a suspect or the numbers on a license plate.

In order for the object identification to be valid as legal evidence, the resolution of the object in the image must be high enough, i.e. the object must cover a certain amount of pixels in the image. This is usually expressed in terms of a pixel density requirement specifying a pixel density (e.g. measured in pixels/m or pixels/m$^2$) which enables identification of the object from the image. For example, police authorities may recommend using a certain pixel density for identity recognition of a face. The recommended pixel density, i.e. the pixel density requirement, may vary between different types of objects. For example, 250 pixels/m may be recommended for face recognition, whereas 100 pixels/m may be recommended for license plate recognition.

In surveillance installations where object detection is important it is therefore crucial to set up an optimal focal length, achieved by setting the level of zoom. The camera should ideally have an as large field of view as possible at the same time as it should capture objects according to the pixel density requirement at a certain distance from the camera.

US 2013/0155295 A1 discloses a method for maintaining a minimum pixel density across an object of interest. In brief, the disclosed method determines a current pixel density of an object in a frame of video, and compares the current pixel density to a minimum pixel density. Based on the comparison, a zoom feature of the camera may be adjusted so as to adjust the current pixel density with respect to the minimum pixel density.

However, the pixel density requirements as for example recommended by police authorities are only valid under optimal light conditions. When scene conditions change, for example when the light level changes, the recommended pixel density requirement may not be enough to ensure a legally valid object identification—a higher pixel density may well be required. It is thus desirable to be able to determine a need for a change in a pixel density requirement due to changing light conditions.

SUMMARY OF THE INVENTION

In view of the above, it is thus an object of the present invention to provide a method, an apparatus, and a system for determining the need for a change in a pixel density requirement due to changing light conditions.

According to a first aspect of the invention, the above object is achieved by a method for determining a need for a change in a pixel density requirement due to changing light conditions, wherein the pixel density requirement specifies a pixel density which enables identification of an object in images captured by a camera, comprising:

receiving and monitoring a camera setting which is indicative of a light condition to which the camera is subjected and which affects the quality of images captured by the camera, the camera setting including at least one of a gain and an exposure time used by the camera when capturing images; and determining that there is a need for a change in the pixel density requirement upon detection of a change in the camera setting.

A camera typically compensates for changing light conditions by changing its settings. For example, if it becomes darker the camera may increase the gain and/or exposure time in order to compensate for the decreasing level of light. Accordingly, the gain and/or exposure time are indicative of the light condition to which the camera is subjected. However, the camera settings will affect the quality of the images captured by the camera. The gain may affect the level of noise in the image in that a higher gain typically gives rise to a lower signal to noise ratio. Similarly, a longer exposure time may give rise to motion blur (i.e. blur caused by moving objects in the scene) in the images captured by the camera. As a result of the change in image quality, there may be a need for a change in the pixel density requirement. By monitoring and detecting a change in the camera setting, such as the gain and/or exposure time, one may thus determine that there is a change in image quality and hence that there is a need for changing the pixel density requirement due to the changing light conditions.

By pixel density requirement is generally meant the minimum number of pixels per unit length or unit area of an object which is required in order to enable identification of the object in an image.

It has been found that the gain has a great influence on the change in image quality in that it introduces noise in the image. The camera setting thus preferably includes a gain used by the camera when capturing images.

As further discussed above, the camera setting affects at least one of a level of noise (via the gain) and a level of motion blur (via the exposure time) in images captured by the camera.

The change in the camera setting may be detected by comparing the change in the camera setting to one or more thresholds. For example, there may be a threshold with respect to the change in gain, and there may be a threshold with respect to the change in exposure time. These thresholds may also be combined such that a change in the camera setting is detected on a condition that at least one of the thresholds is trespassed. This offers a convenient and flexible way of detecting a change in the camera setting.

There may also be one or more thresholds with respect to the value of the gain and/or exposure time. For instance, as long as the exposure time stays below a certain threshold, the exposure time alone does not indicate that there is a need for a change in the pixel density requirement. However, if the gain at the same time exceeds another threshold, this may indicate that there is a need for a change in the pixel density requirement.

Upon determination that there is a need for a change in the pixel density requirement, different actions may be taken.

According to embodiments, the method comprises generating a control signal to adjust a field of view of the camera by alteration of the level of zoom. By altering the level of zoom, the pixel density in the image is altered. For example, as the level of zoom increases the object will be captured with an increased pixel density. In this way, the zoom level may be altered to ensure that an object at a certain distance still may be correctly identified. The control signal may be generated automatically in response to determining that there is a need for a change in the pixel density requirement, or may be initiated by an operator, e.g. in response to receiving an alarm as further explained below.

The camera may be associated with a distance within which identification of objects should be ensured. This distance may hence be seen as a maximum distance from the camera at which objects may be identified. In order to keep the field of view of the camera as large as possible it is desirable to set the level of zoom such that objects at the maximum distance are captured with the pixel density according to the pixel density requirement. In particular, upon determination that there is a need for a change in the pixel density requirement, the control signal may indicate that the level of zoom is to be altered such that the camera captures an object located at a given distance (the maximum distance) from the camera according to the changed pixel density requirement, thereby enabling identification of an object at the given distance.

The level of zoom may be altered according to a function which associates different values of the camera setting with different levels of zoom. For example, the function may be in the form of a table which associates different values of gain and/or exposure time with required zoom level. The function is typically created during configuration of the camera, and typically one function is created for each camera/lens combination and each object type (face, license plate etc.). By having a pre-calculated function, no time-demanding calculations with respect to the required zoom-level needs to be performed during operation of the camera.

According to embodiments, the method comprises generating an event in response to determining that there is a need for a change in the pixel density requirement. In this way, the need for a change in the pixel density requirement may serve as a trigger for an event such that appropriate action may be taken.

Depending on the values of the camera setting, such as the values of gain and/or exposure time, different events may be generated. In particular, the event may be generated according to a function, such as a table, which associates different values of the camera setting with different types of events. Such a function may be defined upon configuration of the camera.

The event may comprise generating an alarm. The alarm may indicate that the pixel density requirement has changed. Upon receiving such an alarm an operator may take appropriate action, such as manually monitoring the images captured by the camera, changing the level of zoom, or adjusting the maximum distance at which objects may be identified.

The event may comprise affecting the light condition to which the camera is subjected by activating or deactivating a light source. In this way, the light conditions that caused the need for a change in the pixel density requirement may be affected such that there no longer is a need for a change in the pixel density requirement. Such an event may be performed automatically in response to determining that there is a need for a change in the pixel density requirement, or may be initiated by an operator in response to receiving an alarm as described above.

The event may comprise providing an indication regarding a maximum distance from the camera at which the camera with its current field of view captures an object according to the changed pixel density requirement, thereby indicating that identification of objects is enabled within the maximum distance. Such an indication may for example be included in the alarm. In this way the operator is made aware of that the maximum distance within which objects may be identified has been changed.

Another example of an event is to overlay an indication on the images captured by the camera showing in which part of the field of view the identification may be correctly done under the current light conditions. Yet another example of an event is to automatically direct another movable camera towards the interesting monitoring area to increase the monitoring efforts.

According to a second aspect of the invention, the above object is achieved by a (non-transitory) computer-readable storage medium comprising computer code instructions which, when executed on a device having processing capability, carry out the method according to any one of the preceding claims.

According to a third aspect of the invention, the above object is achieved by an apparatus for determining a need for a change in a pixel density requirement due to changing light conditions, wherein the pixel density requirement specifies a pixel density which enables identification of an object in images captured by a camera, comprising:

a receiving component configured to receive a camera setting which is indicative of a light condition to which the camera is subjected and which affects the quality of images captured by the camera, the camera setting including at least one of a gain and an exposure time used by the camera when capturing images;

a monitoring component configured to monitor the camera setting; and a determination component configured to determine that there is a need for a change in the pixel density requirement upon detection of a change in the camera setting.

According to a fourth aspect of the invention, the above object is achieved by a system for determining a need for a change in a pixel density requirement due to changing light conditions, wherein the pixel density requirement specifies a pixel density which enables identification of an object in images captured by a camera, comprising:

a camera configured to capture images from which an object is to be identified, and an apparatus according to the third aspect which is arranged to receive a camera setting from the camera.

The second, third and fourth aspects may generally have the same features and advantages as the first aspect. It is further noted that the invention relates to all possible combinations of features unless explicitly stated otherwise.

Generally, all terms used in the claims are to be interpreted according to their ordinary meaning in the technical field, unless explicitly defined otherwise herein. All references to "a/an/the [device, event, message, alarm, parameter, step etc.]" are to be interpreted openly as referring to at least one instance of said device, event, message, alarm, parameter, step etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIG. 4 illustrates an image which is a zoomed-in version of the image of

FIG. 2.

DETAILED DESCRIPTION OF EMBODIMENTS

The present invention will now be described more fully hereinafter with reference to the accompanying drawings, in which currently preferred embodiments of the invention are shown. The systems and devices disclosed herein will be described during operation.

Figure 1:
FIG. 1 illustrates an image captured by a camera under a first light condition. The image comprises objects to be identified.

FIG. 1 illustrates an image 100 of a field of view of a surveillance camera. The image 100 includes objects 102, in this case faces, which potentially need to be identified from images captured by the camera. The image 100 is assumed to be captured during day time when the light condition, i.e. the light level, is optimal or close to optimal, such as at least 100 lx. It is assumed that the gain of the camera is equal to 0 dB under such conditions.

Under these light conditions, there is a certain pixel density requirement which enables identification of the objects 102 in the image 100. For example, there may be a requirement that a face needs to be captured at 250 pixels/m in order to ensure correct identification. Taking the dimensions of a face into account this may correspond to a requirement that a face should cover about 40 pixels along one dimension.

Figure 2:
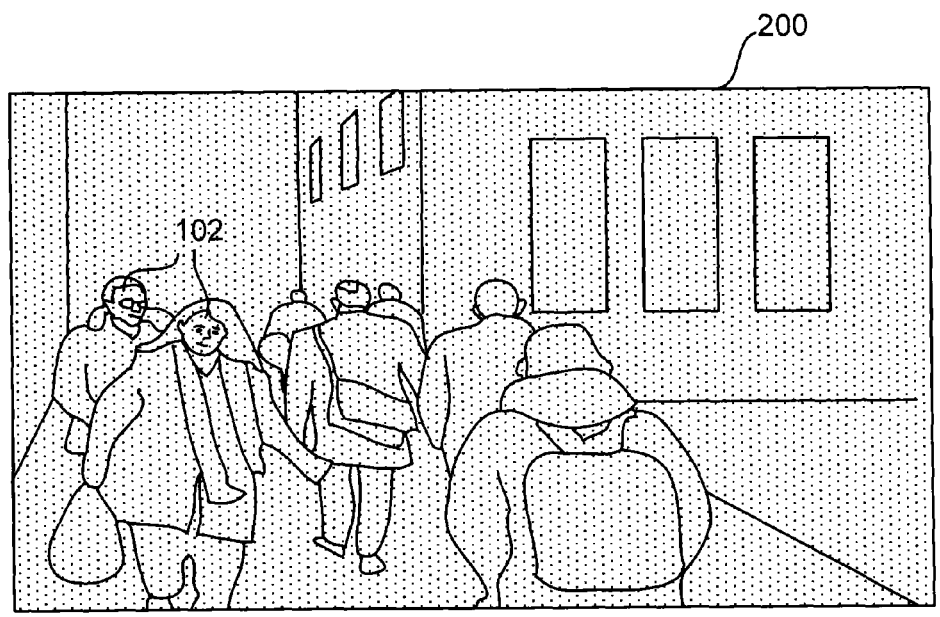
FIG. 2 illustrates an image, corresponding to the image of FIG. 1, captured by a camera under a second, decreased, light condition.

As the light level starts to decrease, for example below 100 lx, the camera automatically modifies its settings, such as gain and/or exposure time, in order to compensate for the changing light condition. Such automatic modification is usually pre-programmed in the camera. Typically, the camera will increase the gain and/or exposure time in response to a decreasing light level. An increase in gain affects the quality of the image 100 in that it introduces noise. An increase in exposure time affects the quality of the image 100 in that it may introduce motion blur. This is illustrated in FIG. 2 which shows an image 200 that corresponds to the field of view of FIG. 1 but at a decreased light level. Due to an increased gain, the image quality of the image 200 is deteriorated in comparison to the image 100 of FIG. 1. By way of example, the gain used when capturing the image 200 may be 21 dB. As a result of the decreased image quality due to noise and/or motion blur, the pixel density requirement that was valid with respect to the light level corresponding to image 100 of FIG. 1 may not be valid with respect to the decreased light level corresponding to image 200 of FIG. 2. For instance, under the light condition of FIG. 2, there may be a need for increasing the pixel density requirement to about 350 pixels/m in order to ensure correct identification.

The automatic modification of the camera settings in response to changing light conditions may include changing the exposure time and the gain in a sequential manner. For example, the camera may increase the exposure time to compensate for the decreasing light level. However, when the exposure time has reached a certain level, for instance when there is a risk of having motion blur in the image, the camera automatically starts compensating with increased level of gain, thereby introducing noise in the image as illustrated by the image 200 of FIG. 2. When the camera has reached a certain level of gain, the camera may start to increase the exposure time again, which may lead to motion blur. When the exposure time has reached a certain length, the risk of motion blur may be too high, and the camera may again start increasing the gain. The increase of gain again introduces further noise in the image. Each of these steps of changing the exposure time and/or gain leads to a deteriorated image quality and may each result in a need for changing the pixel density requirement.

Figure 3:
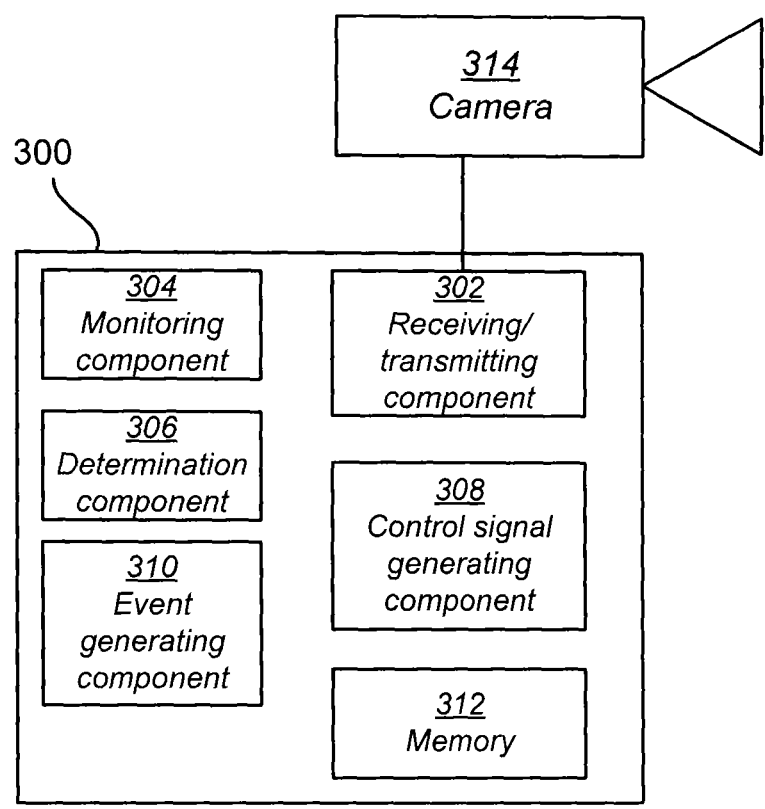
FIG. 3 schematically illustrates an apparatus for determining a need for a change in a pixel density requirement according to embodiments.
Figure 4:
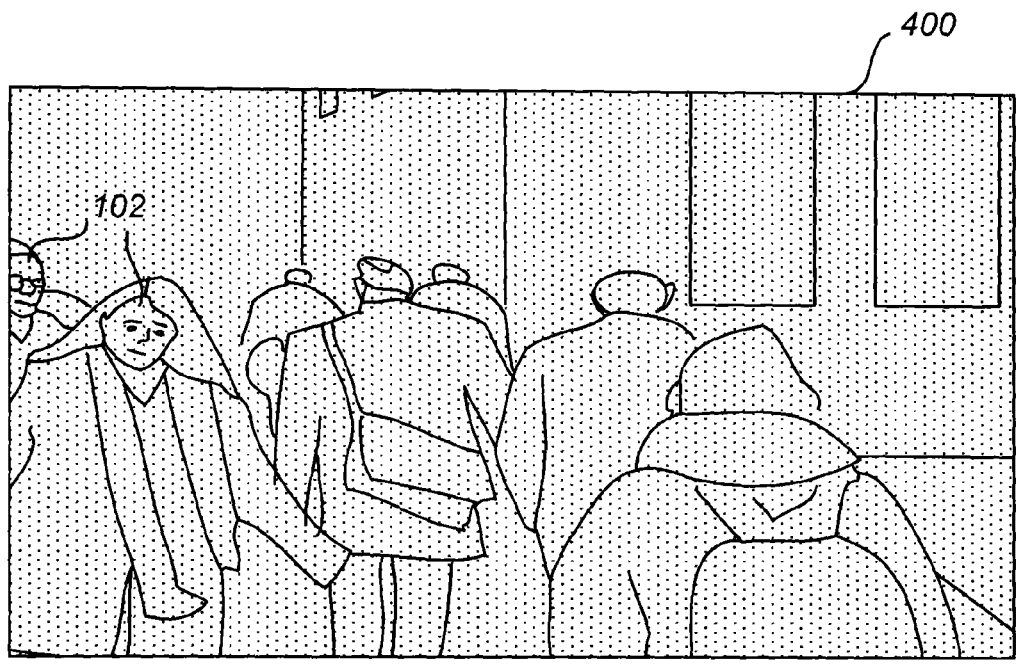

FIG. 3 illustrates an apparatus 300 for determining a need for a change in a pixel density requirement due to changing light conditions. The apparatus 300 comprises a receiving/transmitting component 302, a monitoring component 304, and a determination component 306. The apparatus 300 may further comprise a control signal generating component 308, an event generating component 310, and a memory 312.

The apparatus 300 may be implemented in software and/or hardware. In particular, at least some of the monitoring component 304, the determination component 306, the control signal generating component 308 and the event generating component 310 may be implemented in software. For this purpose the apparatus 300 may comprise a processing unit which in association with the memory 312 (which may serve as a non-transitory computer-readable medium) is configured to implement the methods disclosed herein. Alternatively, at least some of the monitoring component 304, the determination component 306, the control signal generating component 308 and the event generating component 310 may be implemented in hardware.

The apparatus 300 is connected to a camera 314, or may form part of the camera 314. In particular, the receiving/transmitting component 302 is arranged to receive data from the camera 314, including settings of the camera 300 such as exposure time and/or gain, and to transmit data to the camera 314, including control signals for adjustment of the field of view of the camera 314.

Figure 5:
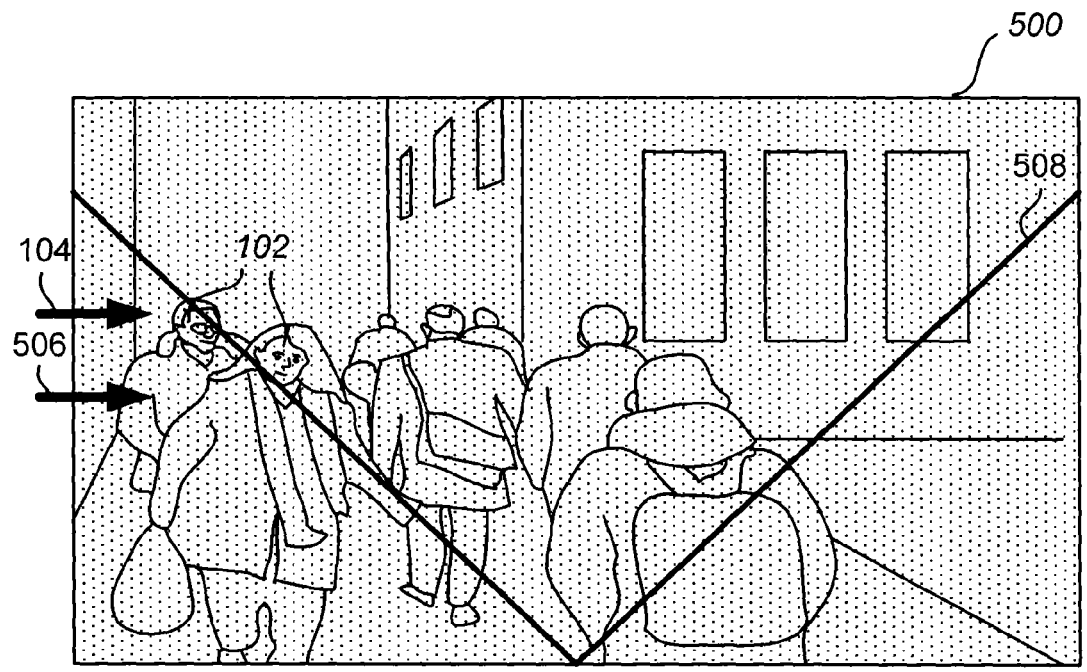
FIG. 5 illustrates an image, corresponding to the image of FIG. 2, with indications for guiding an operator.
Figure 6:
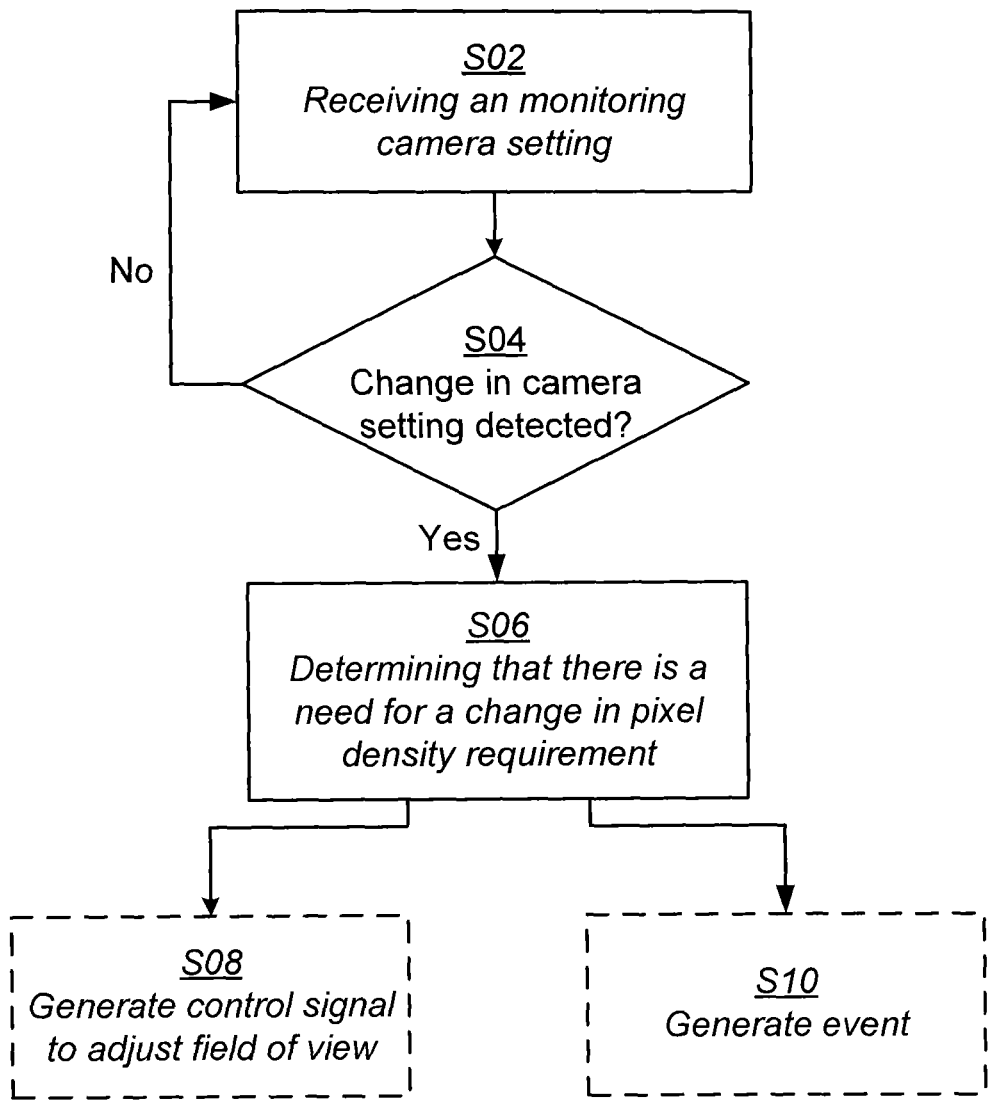
FIG. 6 is a flowchart of a method according to embodiments.

The operation of the apparatus 300 will now be described with reference to FIGS. 1, 2, 4, 5, and the flowchart of FIG. 6.

The receiving component 302, in step S02, receives settings of the camera 314. For example, the receiving component 302 receives the current values of gain and/or exposure timed used by the camera 314 when capturing images. As described above in connection to FIGS. 1 and 2, the received camera settings are indicative of the light condition in that the camera 314 automatically adjusts these parameters to compensate for a changing light condition.

The monitoring component 304 monitors the received camera setting in order to detect whether there is a change in the camera setting. For example, the monitoring component 304 may compare the camera setting with previously received values of the camera setting to see whether the amount of change exceeds a threshold. As long as no change in the camera setting is detected, the monitoring component 304 takes no further action but keeps receiving and monitoring the camera setting.

If a change in the camera setting is detected, the determination component 306, in step S06, determines that there is a need for a change in the pixel density requirement. For example, in the example described with reference to FIGS. 1 and 2, the monitoring component 304 will detect a change in the camera setting as the light level decreases, and the determination component 306 will determine that there is a need for a change in the pixel density requirement.

The apparatus 300 may take different actions in response to detecting that there is a need for a change in the pixel density requirement. In brief, the apparatus 300 may either keep the distance from the camera 314 within which objects 102 can be identified and adjust the field of view, or keep the field of view of the camera 314 and adjust the distance from the camera 314 within which objects 102 can be identified.

According to one embodiment, the apparatus 300 takes action to adjust the field of view of the camera 314. In particular, the control signal generating component 308 may in step S08 generate and send a control signal to the camera 314 to adjust the field of view by alteration of the zoom level. Upon receipt of such a control signal, the camera 314 may alter its zoom level such that the field of view is adjusted.

The field of view of the camera 314 is typically set such that an object 102 located at a given distance (a maximum distance) is captured with the pixel density specified by the pixel density requirement. For instance, in FIG. 1 the field of view may be set such that a face located at a distance of 17 m (as indicated by the arrow 104) from the camera 314 is captured with a pixel density (e.g. 250 pixels/meter) as specified by the pixel density requirement. By way of example the field of view in FIG. 1 may be 85 degrees. In this way one may ensure that objects which are located within the given distance may be identified from the image 100. However, as the light level decreases, such as in FIG. 2, there is a need for increasing the pixel density specified by the pixel density requirement and vice versa. In order to still ensure that objects within the given distance may be identified, the level of zoom is preferably adjusted such that the objects located at the given distance are captured with the increased pixel density. This is further illustrated in FIG. 4 which shows an image 400 that is a zoomed-in version of the image 200 of FIG. 2. By way of example the field of view in FIG. 4 may be decreased from 85 degrees to 40 degrees. As a result of the increased zoom level, the objects 102 are captured with an increased pixel density which allows them to be identified in view of the changed pixel density requirement (such as 350 pixels/m). However, the increases pixel density comes at the cost of the field of view of the camera 314 being decreased.

The control signal generating component 308 may calculate the required zoom level based on a function, or a table, which associates different values of the camera setting with different field of views or different levels of zoom. The function is pre-calculated at the stage of configuring the camera and is different for each camera/lens combination and for each type of object (face, text on license plate etc.). In the illustrated example, the function may say that the field of view should be decreased to 40 degrees when the gain is 21 dB and the distance within which objects should be identified is 17 m.

Alternatively, the control signal generating component 308 may calculate a changed pixel density requirement by using a function or table which associates different values of the camera setting with different pixel densities. Based on the changed pixel density requirement, and with knowledge of the distance within which objects 102 should be identified, the control signal generating component 308 may then determine a desired level of zoom. In the illustrated example, the function may say that the pixel density requirement should be changed to 350 pixels/m when the gain is 21 dB. Based on the changed pixel density requirement and knowledge about the distance within which objects should be identified, the control signal generating component 308 may determine the desired level of zoom.

According to another embodiment, the apparatus 300 takes action by generating an event. In more detail, the event generating component 310 may in step S10 generate an event in response to the determination that there is a need for a change in the pixel density requirement. This is typically used in cases where it is important that the field of view remains unchanged and the level of zoom therefore cannot be altered in order to compensate for the need of changing the pixel density requirement.

The event generating component 310 may generate different events depending on the values of the camera settings. For this purpose, the memory 312 may store a function, such as a table, which associates different values of the camera setting with different types of events. The events may for example include: sending an alarm to an operator that there is a need for a change in the pixel density requirement, such that the operator e.g. may manually monitor the images captured by the camera; affecting the light condition by activating or deactivating a light source such that the light conditions are improved so that the pixel density requirement is again fulfilled; overlaying an indication on the image showing in which part of the field of view the identification may be correctly done; and/or directing another camera towards the interesting monitoring area to increase the monitoring efforts. These events may be performed automatically upon determination that there is a need for a change in the pixel density requirement. Alternatively, some of the events may be initiated by the operator, e.g. in response to receiving an alarm, as will be described in the following.

According to one embodiment, the event generating component 310 generates an alarm to an operator of the camera 314. The alarm may indicate that the pixel density requirement is no longer valid due to the changing light conditions and needs to be changed, or that the pixel density requirement is now valid again. The alarm may indicate a maximum distance from the camera 314 at which the camera 314 with its current field of view captures an object 102 according to the changed pixel density requirement. The alarm may also provide an indication with respect to a recommended change of the field of view. This is further illustrated in FIG. 5. FIG. 5 shows an image 500 which corresponds to the image 200 of FIG. 2. In the image 500 there is a first indicator 104 which indicates the maximum distance at which objects 102 could be identified prior to the change in the light condition. In the image 500 there is further a second indicator 506 which indicates the maximum distance at which objects 102 may be identified after the change in light condition. By way of example, the first indicator 104 could correspond to a distance of 17 m and the second indicator 506 could correspond to a distance of 12 m. In the image there is also an indicator 508 which indicates how the width of the field of view (illustrated by the distance between the legs of the V-shaped indicator 508) would decrease as a result of increasing the zoom value. In more detail, there may be a function or table which for a given field of view associates the camera setting (such as gain and/or exposure time) with a maximum distance. The function or table may be calculated during production of the camera or via an initiation process during installation of the camera. The event generating component 310 may use the function and table in order to indicate a maximum distance corresponding to the current field of view and the current value of the camera setting. In the illustrated example, the function may say that the maximum distance is 12 m when the field of view is 85 degrees and the gain is 21 dB.

Based on the alarm, the operator may decide to keep the current field of view of the camera 314 and accept that objects 102 may only be identified within the maximum distance indicated by the alarm. According to this alternative, no action is thus taken to affect the pixel density of the objects 102 in the image 500. The operator may also be given the chance to take action to affect the pixel density. For example, the operator may be given the option to change the field of view by alteration of the zoom level as described above, activate or deactivate a light source, increase the exposure time (thereby accepting motion blur), direct another camera towards the interesting monitoring area, and/or overlay an indication on the image showing in which part of the field of view the identification may be correctly done.

It will be appreciated that a person skilled in the art can modify the above-described embodiments in many ways and still use the advantages of the invention as shown in the embodiments above. For example, the above embodiments have mainly been exemplified for objects being faces. However, the methods described herein may equally well be applied to other types of objects to be identified, such as text on various types of plates, For that purpose, the apparatus may be configured to receive the type of the object to be identified, such that the pixel density requirements and/or functions or tables described herein that correspond to that particular type of object are used. Thus, the invention should not be limited to the shown embodiments but should only be defined by the appended claims. Additionally, as the skilled person understands, the shown embodiments may be combined.

The invention claimed is:

1. A method for determining a change in a pixel density requirement due to a change in image quality, the method comprising:
   receiving information corresponding to a camera setting which is automatically modified by the camera to compensate for changes in a light condition to which the camera is subjected, wherein the camera setting affects the quality of images captured by the camera and includes at least one of a gain and an exposure time used by the camera when capturing images;
   detecting a change in the camera setting;
   determining to change the pixel density requirement in response to detecting a change in the camera setting, the pixel density requirement corresponding to a minimum number of pixels per unit length or unit area of an object in images captured by a camera;
   identifying an adjusted level of zoom for the camera in response to determining to change the pixel density requirement; and
   generating a control signal to adjust a field of view of the camera based on the adjusted level of zoom for the camera.

2. The method of claim 1, wherein the camera setting includes a gain used by the camera when capturing images.

3. The method of claim 1, wherein the camera setting affects at least one of a level of noise and a level of motion blur in images captured by the camera.

4. The method of claim 1, wherein a change in the camera setting is detected by comparing the change in the camera setting to one or more thresholds.

5. The method of claim 1, wherein the level of zoom is to be adjusted such that the camera captures an object located at a given distance from the camera according to the changed pixel density requirement.

6. The method of claim 1, wherein the level of zoom is to be adjusted according to a function which associates different values of the camera setting with different levels of zoom.

7. A non-transitory computer-readable storage medium comprising computer code instructions which, when executed on a device having processing capability, carry out the method according to claim 1.

8. The method of claim 1, wherein the level of zoom is to be adjusted according to a table stored in memory that associates different values of the camera setting with different levels of zoom.

9. An apparatus comprising:
   a receiver configured to receive a camera setting which is automatically modified by the camera to compensate for changes in a light condition to which the camera is subjected, wherein the camera setting affects the quality of images captured by the camera and includes at least one of a gain and an exposure time used by the camera when capturing images; and
   a processor configured to
      detect a change in the camera setting;
      determine to change the pixel density requirement in response to detecting a change in the camera setting, the pixel density requirement corresponding to a minimum number of pixels per unit length or unit area of an object in images captured by a camera;
      identify an adjusted level of zoom for the camera in response to determining to change the pixel density requirement; and
      generate a control signal to adjust a field of view of the camera based on the adjusted level of zoom for the camera.

10. The apparatus of claim 9, wherein the camera setting includes a gain used by the camera when capturing images.

11. The apparatus of claim 9, wherein the camera setting affects at least one of a level of noise and a level of motion blur in images captured by the camera.

12. The apparatus of claim 9, wherein a change in the camera setting is detected by comparing the change in the camera setting to one or more thresholds.

13. The apparatus of claim 9, wherein the level of zoom is to be adjusted such that the camera captures an object located at a given distance from the camera according to the changed pixel density requirement.

14. The apparatus of claim 9, wherein the level of zoom is to be adjusted according to a function which associates different values of the camera setting with different levels of zoom.

15. The apparatus of claim 9, further comprising:
   a memory configured to store a table associating different values of the camera setting with different levels of zoom.

16. The apparatus of claim 15, wherein the processor is configured to adjust the level of zoom by accessing the memory including the table associating the different values of the camera setting with different levels of zoom.

17. A system comprising:
a camera configured to capture images from which an object is to be identified, and
an apparatus comprising:
- a receiver configured to receive a camera setting which is automatically modified by the camera to compensate for changes in a light condition to which the camera is subjected, wherein the camera setting affects the quality of images captured by the camera and includes at least one of a gain and an exposure time used by the camera when capturing images; and
- a processor configured to
  - detect a change in the camera setting;
  - determine to change the pixel density requirement in response to detecting a change in the camera setting, the pixel density requirement corresponding to a minimum number of pixels per unit length or unit area of the object in the images captured by the camera;
  - identify an adjusted level of zoom for the camera in response to determining to change the pixel density requirement; and
  - generate a control signal to adjust a field of view of the camera based on the adjusted level of zoom for the camera.

* * * * *